Figure 1:
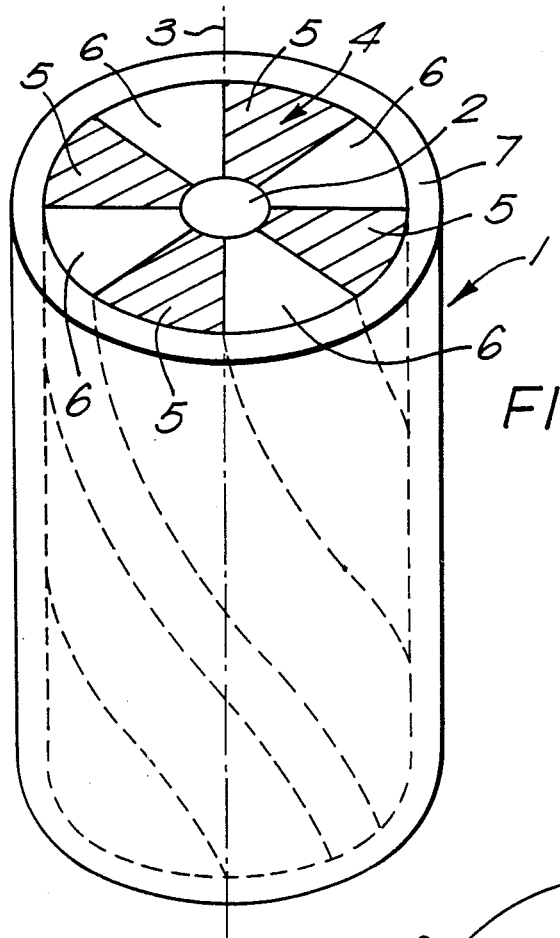

United States Patent [19]

Someda

[11] Patent Number: 4,962,994
[45] Date of Patent: Oct. 16, 1990

[54] CIRCULAR BIREFRINGENT DIELECTRIC WAVE GUIDE

[75] Inventor: Carlo G. Someda, Padua, Italy

[73] Assignee: Pirelli General plc, London, England

[21] Appl. No.: 359,103

[22] Filed: May 31, 1989

[30] Foreign Application Priority Data

May 31, 1988 [IT] Italy .................................. 20804 A/88

[51] Int. Cl.$^5$ ................................................ G02B 6/22
[52] U.S. Cl. ................................. 350/96.33; 350/96.30
[58] Field of Search ............................. 350/96.33, 96.30

[56] References Cited

U.S. PATENT DOCUMENTS 4,717,225 1/1988 Feth et al. ..................... 350/96.30 X
4,758,066 7/1988 Someda ........................... 350/96.30

Primary Examiner—Frank Gonzalez
Assistant Examiner—Phan T. Heartney
Attorney, Agent, or Firm—Brooks Haidt Haffner & Delahunty

[57] ABSTRACT

The wave guide has an annular core region divided into an integral number times eight annular sectors. Respective alternate sectors are of a first type 5 having a substantially constant refractive index and a second type 6 having a refractive index which varies substantially in inverse proportion to the square of the distance from the longitudinal axis 3 of the wave guide. The wave guide is twisted about the axis 3 such that the sectors 5, 6 extend helically. The circular birefringence of the wave guide is improved by the sectors 6 having a different elasto-optic coefficient under torsional stresses to that of the sectors 5.

5 Claims, 1 Drawing Sheet

CIRCULAR BIREFRINGENT DIELECTRIC WAVE GUIDE

The present invention relates to a dielectric wave guide having circular birefringence of the type in which said circular birefringence is realized through the particular structure of the dielectric wave guide.

More precisely the present invention relates to wave guides which in cross-section have an annular region divided into an integral number times 8 angular sectors, respective alternate sectors having different refractive indices $n_3$ and $n_4$.

This annular region forms the radially outermost portion of the dielectric wave guide core and is surrounded by a covering or 'cladding' of refractive index $n_2$.

Within the annular region the radially innermost portion of the core is formed by a circular, central area having a refractive index $n_1$.

Moreover, the dielectric wave guide is twisted around its own longitudinal axis and, consequently, the angular sectors extend helically about that axis.

The refractive indices $n_2$ and $n_3$ of the cladding and a first group, or type, of the sectors respectively are constant both in radial and longitudinal direction to the dielectric wave guide, the refractive index $n_1$ of the central core portion is constant in radial direction but can be constant or variable in the longitudinal direction of the longitudinal axis of said dielectric wave guide.

The refractive index $n_4$ of the second group, or type, of angular sectors is variable in radial direction to the dielectric wave guide substantially in the inverse proportion to the square of the radial distance from the longitudinal axis between a maximum value in the area contacting the central core portion and a minimum value $n_2$ or substantially equal to $n_2$ in the area contacting the cladding.

Such dielectric wave guides have been disclosed in our EP-A Nos. 0210806 and 0274878, and for brevity will be referred to hereinafter as 'military cross wave guides'.

Although the above-mentioned military cross wave guides have a circular birefringence per unit length that is satisfactory, an object of the present invention is to improve their birefringence.

The circular birefringence in said military cross wave guides is obtained through the particular structure of the dielectric wave guide when subjected to torsional stresses.

The present invention achieves improvement of the circular birefringence by the selection of the materials by which the wave guide is formed, these are generally vitreous materials containing dopants or plastics materials.

It is known (for example from the article of R. Ulrich and A. Simon entitled 'Polarization optics of twisted single-mode fibers' published on the magazine 'Applied Optics', Vol. 18 No. 13 of July 1, 1979) that both vitreous and plastics materials from which dielectric wave guides or optical fibres are usually manufactured, always present circular birefringence when subjected to high torsional deformations.

Particularly, as described in the above mentioned article, even a traditional dielectric wave guide or optical fibre having homogeneous core and homogeneous cladding in vitreous doped materials, presents properties of circular birefringence when subjected to high torsional deformation typically of about 10 radians per meter. Such a dielectric wave guide is capable, due to its homogeneity of withstanding the high stresses necessary to achieve the above-mentioned torsional deformation. The same cannot take place for a military cross wave guide, which are not homogeneous due to their own particular structure.

Due to the non-homogeneity of the structure a torsional deformation of an amount equal to the above-mentioned value, would produce localized stresses of such a value to cause breakage of a military cross wave guide.

The present invention enables the circular birefringence in a military cross wave guide to be increased by taking advantage of the properties of the materials of the waveguide and to avoid damage or breakage of the wave guide by torsional deformation.

The invention provides a dielectric waveguide which in cross-section normal to its longitudinal axis has a central circular area having a refractive index $n_1$; an annular intermediate region around said central circular area divided into an integral number times eight angular sectors, respective alternate sectors being of a first type having a refractive index $n_3$ and a second type having a refractive index $n_4$, $n_3$ being substantially constant, $n_4$ varying substantially in inverse proportion to the square of the distance from said longitudinal axis and $n_3$ being not greater that $n_4$ at any point in the wave guide; and an annular outer area having a refractive index $n_2$ disposed around said annular intermediate region; said guide being twisted with respect to the longitudinal axis thereof and being characterised by the angular sectors of the second type having an elasto-optic coefficient under torsional stresses which is different from that of the angular sectors of the first type.

The above term 'elasto-optic coefficient under torsional stresses' used herein is derived from the article of R. Ulrich and A. Simon, entitled 'Polarization optics of twisted single-mode fibers' published on the magazine 'Applied optics', Vol. 18, No. 13 of July 1, 1979, and is a function of the square of the refractive index and the twist rate, and allows the circular birefringence of a material to be calculated when the torsional stresses are known.

Figure 2:
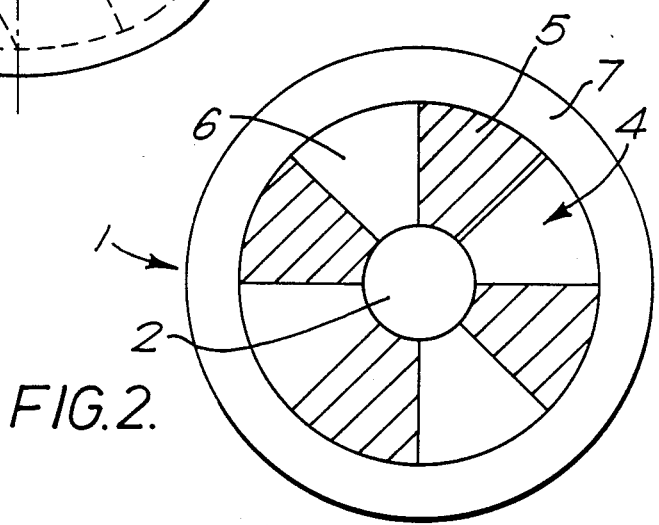

The present invention will be better understood from the following detailed description given only by way of non-limiting example and made with reference to the figures of the enclosed sheet of drawings, in which:

FIG. 1 shows in perspective view a length of a dielectric wave guide having circular birefringence; and FIG. 2 shows the cross-section of the same dielectric wave guide.

The dielectric wave guide having a circular birefringence shown in FIGS. 1 and 2 has the following structure.

The radially innermost portion of the dielectric wave guide 1 is constituted by a central area 2, of circular shape in cross-section normal to the axis 3 and coaxial thereto.

Said central area 2 has a refractive index $n_1$ that is constant or, as alternative, is variable solely in the direction to the axis 3 of the dielectric wave guide.

Around the central area 2 there is an intermediate annular region 4 divided into a plurality of angular sectors comprising angular sectors 5 of a first type and angular sectors 6 of a second type whose characteristics will be described hereinafter.

Outwardly of the annular region 4 is an outer annular area 7, known to the technicians skilled in the field as 'cladding', and having a constant refractive index $n_2$ which is not greater than the refractive index of the angular sectors.

As shown in FIG. 1, the angular sectors extend helically about the longitudinal axis 3 of the dielectric wave guide, this being due to a twisting elastic deformation applied to the latter.

The total number of such angular sectors is an integral number times eight. In the drawing eight such sectors are illustrated but in alternative embodiments not represented the number may be a multiple of 8. In the particular embodiment shown at FIGS. 1 and 2, the angular sectors 5 and 6 have the same angular extent.

According to alternative embodiments not represented, each angular sector 6 has the same angular extent, which is greater or smaller than the angular extent of the sectors 5.

The angular sectors 6 have a constant refractive index $n_3$ and the angular sectors 5 have a refractive index $n_4$ whose value decreases in the radial direction substantially in inverse proportion to the square of the distance from axis 3.

Thus far, the wave guide corresponds to the waveguides disclosed in our earlier European Patent Specifications. The illustrated waveguide differs from those waveguides by the selection of the elasto-optic coefficients under torsional stresses of the sectors of the first type 6 and those of the second type 5 such that they are different and, in particular, such that the elasto-optic coefficient of the angular sectors of the second type 5 is greater than that of the angular sectors of the first type 6.

As a limiting case, the angular sectors of the first type 6 may have an elasto-optic coefficient under torsional stresses that is of zero value by being constituted by a fluid like air or a suitable liquid whereas the angular sectors of the second type 5 have an elasto-optic coefficient under torsional stresses that is different from zero.

In case of dielectric wave guides entirely made of vitreous material or of plastic material, the difference between the elasto-optic coefficient under torsional stresses is preferably comprised between 0.1 and 10 percent. Lesser differences do not allow achievement of an increase in the circular birefringence that warrants the difficulties encountered in manufacturing the wave guide itself and greater differences are detrimental to wave guide integrity.

To provide angular sectors 6 and 5 having elasto-optic coefficients under torsional stresses as aforesaid requires a particular selection of the materials for the constitution of the angular sectors of the two types.

In cases where such sectors comprise vitreous materials, this is achieved by the selection of material and/or of dopants.

Due to the relative difference of the elasto-optic coefficients under torsional stresses between the angular sectors of the first type 6 and of the second type 5, there is a differentiation between the same in respect to their circular birefringence and in particular an increase of the latter in the sectors of the second type 5 with respect to that in the first type of sector 6.

Since most of the guided optical power travels in the sectors of the second type 5, the circular birefringence is increased in the dielectric wave guide through the above-mentioned differentiation of the elasto-optic coefficients.

Such an increase of the circular birefringence is achieved whilst remaining in the range of the torsional stresses to which military cross wave guides are commonly subjected to cause the angular sectors 5 and 6 to extend helically around the longitudinal axis of the guide.

Thus an increase of the circular birefringence is obtained through the selection of the material of the angular sectors without the need to each dangerous values of torsional stresses as far as the integrity of the dielectric wave guides is concerned.

I claim:

1. A dielectric wave guide which in cross-section normal to its longitudinal axis has a central circular area having a refractive index $n_1$; an annular intermediate region around said central circular area divided into an integral number times eight angular sectors, said sectors being spaced from said longitudinal axis by predetermined distances and respective alternate sectors being of a first type having a refractive index $n_3$ and a second type having a refractive index $n_4$, $n_3$ being substantially constant, $n_4$ varying substantially in inverse proportion to the square of the distance of the sector of said second type from said longitudinal axis and $n_3$ being not greater than $n_4$ at any point in said wave guide; and an annular outer area having a refractive index $n_2$ disposed around said annular intermediate region; said wave guide being twisted with respect to the longitudinal axis thereof and being characterized by the angular sectors of the second type having an elasto-optic coefficient under torsional stresses which is different from that of the angular sectors of the first type.

2. A wave guide according to claim 1, wherein said coefficient of the angular sectors of the second type is greater than that of the angular sectors of the first type.

3. A wave guide according to claim 1, wherein said coefficient of the angular sectors of the second type has a value different from zero and said coefficient of the angular sectors of the first type has a substantially zero value.

4. A wave guide according to any one of claims 1 to 3, wherein said coefficient of the angular sectors of the second type differs from that of the angular sectors of the first type by a value ranging from 0.1 to 10 percent.

5. A dielectric wave guide which in cross-section normal to its longitudinal axis has an annular outer core region divided into annular sectors, said sectors being spaced from said longitudinal axis by predetermined distances and respective alternate sectors being of a first type having a substantially constant refractive index and a second type having a refractive index which varies substantially as a function of the distance of the sector of said second type from the said longitudinal axis, said wave guide being twisted about its longitudinal axis such that said sectors extend helically about said axis, and said sectors of the second type having a different elasto-optic coefficient under torsional stresses to that of said sectors of the first type.

* * * * *